United States Patent Office 3,235,386
Patented Feb. 15, 1966

3,235,386
METHOD OF PRODUCING A LOW CALCIUM NON-FAT DRIED MILK PRODUCT
Raymond W. Mykleby, St. Paul, Minn., assignor to Land O' Lakes Creameries, Inc., Minneapolis, Minn., a corporation of Minnesota
No Drawing. Filed Jan. 14, 1964, Ser. No. 337,527
4 Claims. (Cl. 99—56)

This application is a continuation-in-part of my application Serial No. 200,326, filed June 6, 1962, now abandoned.

This invention relates to a method of producing a non-fat dried milk product which has a low calcium content.

While it is relatively easy and inexpensive to add any desired amounts of calcium to dry milk type products, the only method for removing calcium from such products which has been used to any extent in the industry has been an ion exchange process which is extremely costly in the initial plant installation and is also an expensive process to operate. Since dry milk type products are more desirable for many uses if they have a relatively low calcium content, it is important that an inexpensive process for producing such a product be provided.

It is, therefore, an object of this invention to provide a process by which a low calcium non-fat dried milk product can be easily and economically produced.

More specifically, it is an object to provide a process for inexpensively producing a low calcium non-fat dried milk product by blending between 27% and 35% acid precipitated casein with between 61.5% and 69.5% rennet precipitated cheddar cheese whey.

Milk protein concentrates are produced by two different conventional processes, both of which are well known by those skilled in the art. One of these processes utilizes an acid to produce casein by precipitating the curd of the skim milk and thus permit separation of the low calcium casein curd from the whey. Another conventional method (non-acid) involves the use of enzymes such as rennet or rennin to produce cheddar cheese by precipitating the cheddar cheese curd and thus permit separation of the low calcium whey therefrom.

Casein produced by this well known acid precipitation process has a relatively low calcium content because in this process most of the calcium in the skim milk is retained by the whey, and the casein curd produced by this process retains relatively little of this calcium. Casein thus produced also has a high protein content, a low lactose content and a low butterfat content, the composition thereof being as follows:

| | Percent |
|---|---|
| Protein | 90.0 |
| Lactose | 1.5 |
| Butterfat | 1.5 |
| Moisture | 5.0 |
| Calcium, less than | 0.1 |
| Other minerals, approximately | 1.9 |

Cheddar cheese produced by the well known rennet or rennin (non-acid) process retains most of the calcium from the milk in the cheese curd, thus leaving the whey relatively calcium-free. The cheddar cheese whey has a relatively high lactose content while having low protein and low butterfat content, the composition thereof being substantially as follows:

| | Percent |
|---|---|
| Protein | 12.5 |
| Lactose | 73.6 |
| Butterfat | 1.2 |
| Moisture | 5.0 |
| Calcium, less than | 0.7 |
| Other minerals, approximately | 7.0 |

Natural non-fat dried milk as used in this application is defined as the non-fat dried milk product produced by removing fat and water from natural milk. During any yearly period, the composition of such natural non-fat dried milk will vary within the following range (computed by weight):

| | Percent |
|---|---|
| Protein | 33.0–39.0 |
| Lactose | 48.0–55.0 |
| Butterfat | 0.4–1.5 |
| Moisture | 1.5–5.0 |
| Calcium | 1.1–1.5 |
| Other minerals | 5.9–7.5 |

I have discovered that the casein and cheddar cheese whey thus produced are entirely compatible when mixed together and can be blended to produce a low calcium non-fat dried milk product having either a high or low protein or lactose content, as desired.

It is well known in the art that the pH of the final blend must be maintained between the range of 6.5 and 7.5 in order to stabilize the protein and maintain uniform dispersion thereof in the product when ultimately mixed with water.

The excess acid can be neutralized to the above desired pH by adding any one of a number of well known non-toxic calcium-free acid neutralizing agents such as alkali metal bases and salts. Hydroxides, phosphates, carbonates or bicarbonates of sodium, potassium, magnesium, ammonium or lithium may be used for this purpose. It will be apparent to those skilled in the art that other such neutralizing agents may also be used.

The following is a diagram showing the production of the casein and cheddar whey:

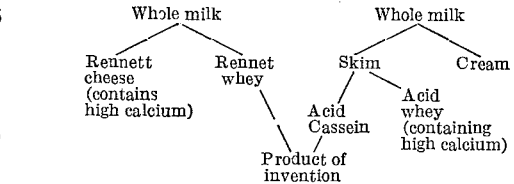

Three examples of different blended proportions are indicated below with the resulting composition of the respective non-fat dried milk products produced thereby (each with 5.0% moisture) to illustrate particularly the possible variations in protein content for a low calcium, non-fat dried milk product readily available with this process:

*Proportions of blended ingredients*

| | Example No. 1 | Example No. 2 | Example No. 3 |
|---|---|---|---|
| | Percent | Percent | Percent |
| Acid Casein | 27.0 | 31.0 | 35.0 |
| Rennet Whey | 69.5 | 65.5 | 61.5 |
| Acid Neutralizing Agent | 3.5 | 3.5 | 3.5 |
| | 100.0 | 100.0 | 100.0 |

*Compositions of resulting products*

| | Example No. 1 | Example No. 2 | Example No. 3 |
|---|---|---|---|
| | Percent | Percent | Percent |
| Protein | 33.0 | 36.0 | 39.0 |
| Lactose | 53.0 | 50.0 | 47.0 |
| Moisture | 5.0 | 5.0 | 5.0 |
| Butterfat | 0.7 | 0.7 | 0.7 |
| Calcium | 0.5 | 0.5 | 0.5 |
| Other Minerals | 7.8 | 7.8 | 7.8 |
| | 10090 | 100.0 | 100.0 |

The two products may be combined either in a liquid state or as individual powders to form the ultimate blended product. The non-fat product thus produced will have substantially greater ability to absorb water than would conventionally produced spray dried non-fat dry milk. This, of course, has many advantages in bread making, sausage making or as an ingredient in an ice cream mix or any food where ability to hold moisture is desirable. It may be used as a complete substitute or a substitute-in-part for vegetable colloids or stabilizers used to produce stability and body in ice cream mixes or frozen desserts. In addition to its water absorption properties, it is also more dispersable in water than is spray-dried non-fat dry milk and the calcium content, as has been pointed out, is substantially less than the calcium content in non-fat dry milk products.

It will be seen that I have provided a blended product having extremely low calcium content which greatly facilitates control of the calcium content at any point above the level of the manufactured process by merely adding the desired amount of calcium thereto. As has been stated, this can be inexpensively and easily done in sharp contrast to the relatively high cost and difficulty in removing calcium from such a product.

Other uses than those listed above for the product may ultimately become evident.

What I claim is:

1. The method of producing a low calcium highly soluble non-fat dried milk product, comprising:
    (a) producing cheddar cheese whey from whole milk by non-acid rennet coagulation of said whey;
    (b) producing casein from skim milk by acid precipitation;
    (c) blending between 27% and 35% casein precipitate with between 61.5% and 69.5% whey;
    (d) neutralizing the casein and whey by adding a non-toxic calcium-free acid neutralizing agent to establish the ultimate pH of the mixture within the range of 6.5 to 7.5.

2. The method of producing a low calcium highly soluble non-fat dried milk product, comprising:
    (a) producing cheddar cheese whey from whole milk by non-acid rennet coagulation of said whey;
    (b) separating said whey from the liquid;
    (c) producing casein from skim milk by acid precipitation;
    (d) separating the casein precipitate from the liquid;
    (e) blending between 27% and 35% dried casein with between 61.5% and 69.5% of whey
    (f) adding approximately 3.5% calcium-free acid neutralizing agent.

3. The method of producing a low calcium highly soluble non-fat dried milk product comprising:
    (a) producing cheddar cheese whey from whole milk by non-acid rennet coagulation of said whey;
    (b) producing casein from skim milk by acid precipitation;
    (c) neutralizing the casein by adding a non-toxic calcium free acid neutralizing agent thereto;
    (d) blending the neutralized casein in a range of 27 to 35 percent and whey in a corresponding range of 69.5 to 61.5 percent to establish an ultimate pH of the mixture within a range of 6.5 to 7.5.

4. The method of producing a low calcium highly soluble non-fat dried milk product comprising:
    (a) producing cheddar cheese whey from whole milk by non-acid rennet coagulation of said whey;
    (b) producing casein from skim milk by acid precipitation;
    (c) blending the whey in a range of 61.5 to 69.5 percent with a non-toxic calcium free acid neutralizing agent and blending the whey and casein in a corresponding range of 35 to 27 percent to establish the ultimate pH of the mixture to be within the range of 6.5 to 7.5.

References Cited by the Examiner

UNITED STATES PATENTS 2,998,315   8/1961   Peebles et al. _____ 99—57

OTHER REFERENCES

Whittier et al.: The Byproducts of Milk, 1950, Rheinhold Publishing Co., N.Y., p. 14.

A. LOUIS MONACELL, *Primary Examiner.*

M. W. GREENSTEIN, *Assistant Examiner.*